United States Patent
Cooper

(10) Patent No.: US 8,061,244 B2
(45) Date of Patent: Nov. 22, 2011

(54) COMPLIANT CUTOFF SAW ASSEMBLY

(75) Inventor: Christopher W. Cooper, Hoover, AL (US)

(73) Assignee: Action Machinery Company of Alabama, Inc., Helena, AL (US)

( * ) Notice: Subject to any disclaimer, the term of this patent is extended or adjusted under 35 U.S.C. 154(b) by 25 days.

(21) Appl. No.: 11/181,615

(22) Filed: Jul. 14, 2005

(65) Prior Publication Data

US 2005/0247175 A1 Nov. 10, 2005

Related U.S. Application Data

(62) Division of application No. 10/126,222, filed on Apr. 19, 2002, now abandoned.

(51) Int. Cl.
*B26D 1/00* (2006.01)
*B26D 3/00* (2006.01)

(52) U.S. Cl. .............................. 83/13; 83/914

(58) Field of Classification Search .................... 83/914; 451/24; 901/31–39
See application file for complete search history.

(56) References Cited

U.S. PATENT DOCUMENTS

| | | | |
|---|---|---|---|
| 3,557,652 A | 1/1971 | Krail | |
| 3,952,458 A * | 4/1976 | Tomita et al. | 451/11 |
| 4,094,102 A | 6/1978 | Lauze | |
| 4,221,514 A | 9/1980 | Pavlovsky | |
| 4,273,506 A * | 6/1981 | Thomson et al. | 414/735 |
| 4,357,848 A * | 11/1982 | Sakurai et al. | 83/801 |
| 4,501,094 A | 2/1985 | Veale | |
| 4,520,597 A | 6/1985 | Lindberg | |
| 4,570,385 A * | 2/1986 | Richter et al. | 451/5 |
| 4,603,511 A | 8/1986 | Komatsu et al. | |
| 4,637,775 A | 1/1987 | Kato | |
| 4,777,769 A | 10/1988 | McLaughlin et al. | |
| 4,894,597 A | 1/1990 | Ohtomi | |
| 5,077,941 A | 1/1992 | Whitney | |
| 5,079,874 A * | 1/1992 | Luber | 451/11 |
| 5,119,600 A | 6/1992 | Chikatsune et al. | |

(Continued)

FOREIGN PATENT DOCUMENTS

EP 0 228 974 A 7/1987

(Continued)

OTHER PUBLICATIONS

European Search Report Dated Nov. 17, 2005.

(Continued)

*Primary Examiner* — Ghassem Alie
*Assistant Examiner* — Bharat C Patel
(74) *Attorney, Agent, or Firm* — Smith Gambrell & Russell LLP

(57) ABSTRACT

A cutoff saw assembly incorporates a robot assembly with a compliant cutting apparatus to remove various undesired metal extensions from a casting. The assembly cooperatively and conjunctively controls the position of the casting using the robot assembly and the force exerted by the cutting apparatus on the casting using a compliance control system. The compliance control system includes a compliance actuator that is connected to a compliance regulator. Both the robot assembly and the compliance control system are connected to a system controller. The compliance actuator is connected to the cutoff blade to actively vary the force of the cutting blade with respect to the casting. The compliance regulator, which is connected to the system controller, will measure and regulate the pressure in the compliance actuator, such that the robot assembly and compliance control system can apply the required force to cut the casting.

7 Claims, 1 Drawing Sheet

U.S. PATENT DOCUMENTS

| | | | |
|---|---|---|---|
| 5,126,645 A | | 6/1992 | Yoshimi et al. |
| 5,146,714 A | * | 9/1992 | Luber ............................. 451/5 |
| 5,295,795 A | * | 3/1994 | Yasuda et al. ................ 417/213 |
| 5,299,389 A | * | 4/1994 | Yonaha et al. ................... 451/5 |
| 5,509,848 A | | 4/1996 | Shimbara |
| 5,761,390 A | * | 6/1998 | Koshishiba et al. ......... 700/250 |
| 5,799,135 A | * | 8/1998 | Terawaki ..................... 700/258 |
| 5,814,959 A | | 9/1998 | Nonaka |
| 5,892,345 A | * | 4/1999 | Olsen ........................... 318/571 |
| 6,165,057 A | | 12/2000 | Gill, Jr. |
| 6,358,037 B1 | * | 3/2002 | Redies et al. ................ 425/527 |
| 6,382,064 B1 | | 5/2002 | Dugger |
| 6,876,899 B2 | * | 4/2005 | DeCord, Jr. .................. 700/146 |

FOREIGN PATENT DOCUMENTS

| | | |
|---|---|---|
| JP | 07 164132 A | 6/1995 |
| JP | 2001 341053 | 8/2002 |

OTHER PUBLICATIONS

European Examination Report Dated Jul. 11, 2006.

\* cited by examiner

COMPLIANT CUTOFF SAW ASSEMBLY

CROSS-REFERENCE TO RELATED APPLICATIONS

This utility application is a divisional application claiming priority from non-provisional utility U.S. patent application Ser. No. 10/126,222, filed on Apr. 19, 2002 now abandoned, which is herein incorporated by reference.

FIELD OF THE INVENTION

The present invention relates generally to the field of metal casting. More particularly the present invention relates to the cutoff of excess material on metal castings after it has been removed from the mold. In even greater particularity the present invention relates to the removal of riser or gate remnants after a cast part has been removed from the mold and to a process for perfecting the cutoff operation by conjunctively using a robot and a compliant cutoff saw.

BACKGROUND OF THE INVENTION

In the casting arts, molten metal is poured into a mold through an opening in the top of the mold with a certain excess metal filling the channel to the mold cavity. When multiple parts are cast in the same casting vessel, the mold will include channels in the form of a sprue to each cavity for each part, which will create undesired dross on the outer surface of the casting once the molten metal has hardened into the casting. The excess metal, such as those referred to as risers or gates, is frequently required to be removed by a cutoff or grinding operation in order for the casting to perform the purpose intended.

There are several common practices used by foundries to remove the risers or gates from the castings. These practices include, but are not limited to, removal of the riser by means of a gas torch, a grinder, a conventional cutting blade or saw, or some similar machine for forcefully removing the dross. Moreover, after the gates or risers have been removed from the casting through any of these methods, the operator commonly has to further grind or finish the casting due to an uneven cut caused by the respective trimming method.

The most common practice of cutoff operation is conventionally done either by an operator controlling a machine having a cutoff blade or automatically by means of a robotic device having a cutting blade. In the first example, the operator controls the machine that applies a cutting force that may come from an external force, such as a hydraulic cylinder, or it may be generated manually by the operator physically controlling the cutting force with his own strength and weight. In the second embodiment, the robot may be used to hold the casting to engage a fixed cutoff saw, or to the contrary the robot may hold the cutoff saw while the casting is in a fixed position.

Robots have been used for years to control the movement of a casting through a cutoff blade. In addition, hydraulic, pneumatic or electric cutoff saws have also been used in the common foundry to push the blade (or casting) through the casting (or blade). However, these solutions incorporating the use of the robot experience inherent problems. For example, one inherent problem with the use of the robot to control the cutoff operation is that the cutting wheel will have a short abrasive life. In addition, this solution requires a long robot cycle time to cut the riser. Moreover, significant heat is generated in the casting in such a method due to incorrect cutting force or pressure. Cutting forces that are lower than that prescribed by the blade manufacturer can cause excessive heat in the blade and the material being cut. These high temperatures in the material can degrade the properties of the material, resulting in scrap or wasted castings. Finally, there is frequently an inconsistent cut in the casting due to deflection and vibration in the robot, which could lead to possible damage to both the robot and the cutoff saw due to inconsistent gates or risers.

What is desired, then, and not found in the prior art, is a compliant cutoff saw assembly having a design that will accurately and efficiently cut a casting supported by a constant force or pressure as chosen for the particular casting to maintain the integrity of the casting and the functionality of the assembly.

SUMMARY OF THE INVENTION

An object of the present invention is to provide an assembly for removing excess material from a casting.

A further object of the present invention is to provide an assembly incorporating a compliant cutoff saw in conjunction with a robot to eliminate risers on castings.

Another object of the present invention is to provide an assembly for cutting through a casting that provides a cooler temperature in the casting when being cut.

Yet a further object of the present invention is to provide an assembly for cutting through a casting that provides a consistent cut.

A further object of the present invention is to provide an assembly for cutting through a casting that has a long abrasive wheel life for the cutting element.

Another object of the present invention is to provide an assembly for cutting through a casting that will reduce deflection and vibration in the robot by maintaining a constant cutting force.

In particular, the compliant cutoff saw assembly includes a robot assembly that is used with a cutting apparatus to remove various undesired metal extensions from a casting. The compliant cutoff saw assembly has the ability to cooperatively and conjunctively control both the position of the casting as well as the force exerted by the cutting apparatus on the casting. The combination of controls allows the compliant cutoff saw assembly to provide a clean and even incision on the casting, which eliminates or at least reduces the amount of work required to finish the casting after the undesired metal extensions have been removed.

The robot assembly of the present invention includes a multi-positional robot arm that is connected to a system controller. A tooling clamp is connected to the free end of the robot arm, with the tooling clamp being used to engage and securely hold the casting to be cut. The robot arm is able to move in three dimensions, and can therefore position the casting in any dimension as desired by the operator. Consequently, the cutting apparatus saw will be able to cut most any side, surface or portion of the casting as desired by the operator of the system.

The cutting apparatus of the present invention includes a frame having a mounting assembly to which a support beam is pivotally affixed. A drive motor is attached to the lower end of the support beam, with a cutoff blade being rotatably attached to the upper end. The drive motor is mechanically connected to the cutoff blade to drive and control the rotation of the cutoff blade as desired by the operator pursuant to the casting being cut.

In addition, the cutting apparatus includes a compliance control system that includes a compliance actuator that is connected to a compliance regulator. The compliance actuator is connected between the upper end of the support beam and the frame, such that the compliance actuator will be able to actively vary the force of the cutting blade with respect to the casting. The compliance regulator, which is connected to the system controller, will measure and regulate the pressure in the compliance actuator. Consequently, the system controller has the ability to adjust the setpoint of the compliance regulator and precisely control the movement of the robot arm so that the casting will be cut as desired by the operator.

These and other objects and advantages of the invention will become apparent from the following detailed description of the present invention.

BRIEF DESCRIPTION OF THE DRAWING

A compliant cutoff saw assembly embodying the features of the present invention is depicted in the accompanying drawing which forms a portion of this disclosure and wherein.

DESCRIPTION OF THE PREFERRED EMBODIMENT

Figure 1:
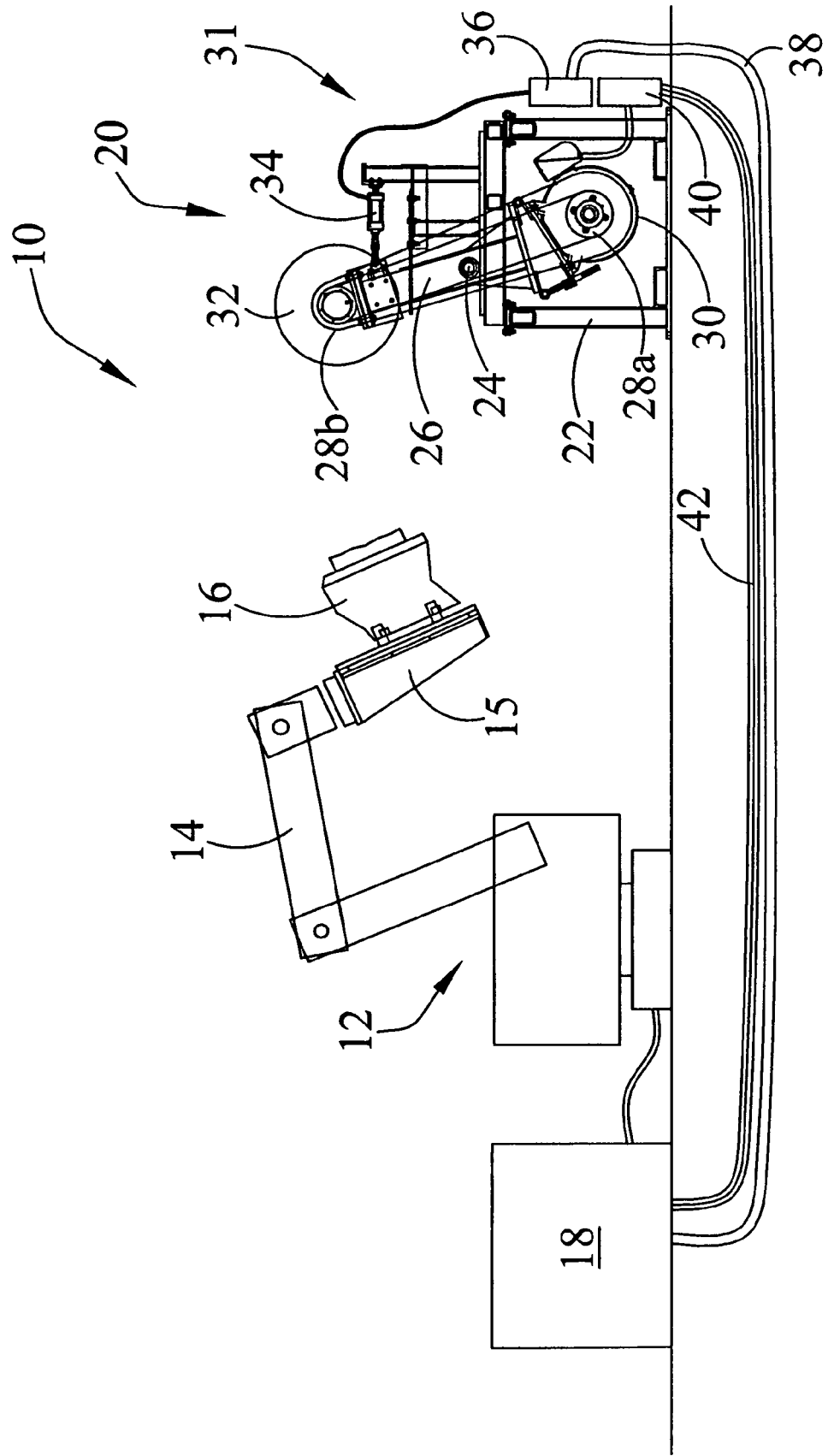
FIG. 1 is a side elevational view of the present invention of a compliant cutoff saw assembly.

Looking now to FIG. 1, the present invention of a compliant cutoff saw assembly 10 is illustrated. The compliant cutoff saw assembly 10 encompasses a robot assembly 12 used in conjunction with a cutting apparatus 20 to remove undesired metal extensions from a casting 16. The compliant cutoff saw assembly 10 has the ability to cooperatively and contemporaneously control both the position of the casting 16 as well as the compliance force exerted by the cutting apparatus 20 on the casting 16 during the incision as the robot urges the casting through the blade. The combination of these controls allows the compliant cutoff saw assembly 10 to provide a clean and even cut into the casting 16, which reduces or eliminates the amount of work required to finish the casting 16 once the metal extensions have been removed.

Referring to FIG. 1, the first component of the present invention is the robot assembly 12 which includes a multi-positional robot arm 14 that is connected to a system controller 18. A tooling clamp 15 is connected to the unattached end of the robot arm 14, with the tooling clamp 15 being used to engage and securely hold the casting 16 to be cut. The robot arm 14 is able to move in three dimensions, and can therefore position the casting 16 in any dimension as desired by the operator. Consequently, the compliant cutoff saw 20 will be able to cut any side, surface or portion of the casting 16 as desired by the operator of the compliant cutoff saw assembly 10.

The second component of the present invention is the cutting apparatus 20 which preferably includes a frame 22 that is sturdily positioned on a ground or floor surface. The frame 22 comprises a mounting assembly 24 that includes a shaft and a pair of bearings, with a support beam 26 being pivotally affixed to the mounting assembly 24. The support beam 26 includes a lower end 28a and an upper end 28b, with a drive motor 30 being attached to the lower end 28a and a cutoff blade 32, such as an abrasive blade, carbide blade, diamond-tipped blade or other cutting device, being rotatably attached to the upper end 28b in the present embodiment. The drive motor 30 is mechanically connected to the cutoff blade 32 to drive and control the rotation of the cutoff blade 32 as desired by the operator pursuant to the requirements of the casting 16 being cut. Moreover, the drive motor 30 is connected to a drive system 40, which preferably includes a vector drive, such that the drive system 40 can control and vary the operation of the drive motor 30 and thus the speed of rotation of the cutoff blade 32. The drive system 40 is further connected to said system controller 18 via drive cable 42, such that the drive system 40 can receive communications from the system controller 18 directing operation of the drive motor 30.

The cutting apparatus 20 of the present invention includes a compliance control system 31 that includes a compliance actuator 34 that is connected to a compliance regulator 36. In the embodiment illustrated, the compliance actuator 34 is a pneumatic cylinder, although it is to be expected that any other actuator design, such as a hydraulic cylinder or electric actuator, could be incorporated and effectively used in the present invention. Additionally, the compliance regulator 36 is a conventional pressure regulator that is commonly known in the art. The compliance regulator 36 is able to measure and control the pressure in the compliance actuator 34 and verify that compliance actuator 34 has the desired pressure setpoint as determined by the system controller 18 for the casting 16 to be cut with the robot assembly 12.

As stated above, the cutting compliance actuator 34 is designed to support the cutting blade 32 with the force required depending on the physical characteristics of the casting 16. Such support can come in various ways that are not discussed in detail herein. However, in the embodiment of the present invention, the compliance actuator 34 is positioned between the upper end 28b of the support beam 26 and the frame 22, such that the compliance actuator 34 will apply a given force to the upper end 28b of the support beam 26 to pivot the support beam 26 about the mounting assembly 24. The pivoting motion of the support beam 26 will move the cutoff blade 32 toward and away from the casting 16. The compliance force of the compliance actuator 34 is controlled by the compliance regulator 36. The compliance regulator 36 is thereby further connected to the system controller 18 via a standard connecting line 38 such that the system controller 18 is able to provide a setpoint to the compliance regulator 36. The system controller 18 can thereby send a signal to the compliance regulator 36 to alter the pressure applied by the compliance actuator 34 as necessary pursuant to various factors, such as the shape of the casting 16, the composition of the material used in the casting 16, and the product standards of the cutoff blade 32 set forth by the blade manufacturer.

The steps of operation of the compliant cutoff saw assembly 10 are as follows. Initially, the system controller 18 is programmed according to the physical characteristics of the casting 16 to be processed, and will direct the robot arm 14 to engage a newly-formed casting 16 with the tooling clamp 15. The system controller 18 will then reposition the robot arm 14 and tooling clamp 15 according to the program such that the casting 16 is proximate the cutting apparatus 20. More particularly, the casting 16 will be positioned within the range of the cutoff blade 32. As stated above, the movement of the cutoff blade 32 will be in a general direction toward the robot arm 14 and the casting 16. In particular, the compliant cutoff saw assembly 10 will allow the cutoff blade 32 to move in the direction of the desired cut in the casting 16.

As discussed above, the system controller 18 is connected to the robot assembly 12, the compliance actuator 34, and the drive system 40 of the cutting apparatus 20. Consequently, the system controller 18 is able to not only send a signal to the robot arm 14 and the compliance regulator 36, but it is also able to communicate with the drive system 40 corresponding to the desired speed of rotation of the cutoff blade 16. In particular, the system controller 18 is programmed to control the robot 12 and the cutting apparatus 20 pursuant to the requirements of the casting 16 being trimmed. The program for the system controller 18 also establishes the necessary cutoff speed of the cutoff blade 32 and the force for a particular casting 16 to be cut, and in turn the system controller 18 sends a command to the compliance regulator 36 and/or the drive system 40 for cutoff saw speed control.

The operation of the cutoff blade 32 of the present invention may be either at a variable speed with the use of the drive system 40 or at a fixed speed. While speed control is not necessary in the present invention, it can improve the results of the trimming of the casting 16. For example, it is commonly known that the surface feet per minute ("SFPM") of the cutoff blade 16 (revolutions per minute times the circumference of the cutting blade 16), decreases as the cutoff blade 16 gets smaller. As the SFPM decreases, the cutoff blade 16 is less efficient and will cut less aggressively. This provides negative results, in that not all of the horsepower of the motor 30 is used, heat is generated in the casting 16, and cut-off times of the compliant cutoff saw assembly 10 are longer. Consequently, keeping the SFPM at a constant reduces these associated problems that waste time and castings.

In addition, a wheel measurement device (not illustrated) may be connected to the cutting apparatus 20 to monitor and adjust the speed of the cutoff blade 32 relative to the diameter of the cutoff blade 32. By monitoring the speed of the cutoff blade 32, the system controller 18 is able to maintain a constant surface speed of the cutoff blade 32.

It should further be noted that while the embodiment described above teaches the use of the robot 12 holding the casting 16, additional embodiments may reverse the positioning of the casting 16 and the cutoff blade 32. That is, a further embodiment of the present invention may require that the casting 16 be held by the support beam 26 or the frame 22, while the cutoff blade 32 is rotatably mounted to the free end of the robot arm 14. Such a design would nonetheless include a compliance control system 31 similar to the one described above so that the operator would be able to trim the casting 16 as desired.

Thus, although there have been described particular embodiments of the present invention of a new and useful COMPLIANT CUTOFF SAW ASSEMBLY, it is not intended that such references be construed as limitations upon the scope of this invention except as set forth in the following claims.

What is claimed is:

1. A method for cutting off excess material from a casting comprising the steps of:
   a) programming a system controller to cooperatively manage a robot arm and a compliance control system controlling a cutting force of a cutoff blade for removing the excess material from the casting;
   b) engaging the casting with said robot arm;
   c) transporting the casting to a position proximate a cutoff blade using said robot arm;
   d) urging the casting into engagement with said cutoff blade using said robot arm;
   e) controlling the cutting force of the casting engaging said cutoff blade with said compliance control system, said compliance control system controlling the cutting force by allowing said cutoff blade to move with the casting and by moving said cutoff blade toward the casting to maintain the constant cutting force between the casting and said cutoff blade; the step of controlling the cutting force comprising:
   positioning an actuator between said cutoff blade and a frame;
   connecting said actuator to a compliance regulator;
   connecting said compliance regulator that measures and controls pressure in said actuator to said system controller, said system controller providing a preset pressure setpoint in said compliance regulator; and
   controlling the pressure in said actuator with said compliance regulator to bias said cutoff blade as said casting comes into contact with said cutoff blade.

2. The method as described in claim 1 further comprising the step:
   controlling a drive system corresponding to the desired speed of rotation of said cutoff blade to engage the casting.

3. The method as described in claim 1, further comprising the step of:
   controlling the necessary cutoff speed of said cutoff blade using said system controller.

4. The method as described in claim 2 further comprising the step of:
   maintaining a constant surface feet per minute of said cutoff blade with said drive system as said cutoff blade reduces in size.

5. A method for cutting off excess material from a casting comprising the steps of:
   a) programming a system controller to cooperatively manage a robot arm and a compliance control system controlling a cutting force of a cutoff blade for removing the excess material from the casting;
   b) engaging the casting with the robot arm;
   c) transporting the casting to a position proximate a cutoff blade using said robot arm;
   d) urging the casting into engagement with said cutoff blade with said robot arm;
   e) controlling the cutting force of the casting engaging said cutoff blade with said compliance control system biasing said cutoff blade with respect to the casting to maintain the constant cutting force between the casting and said cutoff blade, the step of controlling the cutting force further comprising:
   positioning an actuator between said cutoff blade and a frame;
   connecting said actuator to a compliance regulator;
   connecting said compliance regulator that measures and regulates pressure in said actuator to said system controller, said system controller providing a preset pressure setpoint in said compliance regulator; and
   controlling the pressure in said actuator with said compliance regulator to bias said cutoff blade as said casting comes into contact with said cutoff blade.

6. A method for cutting off excess material from a casting comprising the steps of:
   a) programming a system controller to cooperatively manage a robot arm and a compliance control system controlling a cutting force of a cutoff blade for removing the excess material from the casting;
   b) engaging the casting with said robot arm;
   c) transporting the casting by said robot arm to a position proximate a cutoff blade supported by a beam, said beam engaged by an actuator that is controlled by a compliance regulator that measures and regulates pressure in said actuator, said compliance regulator further connected to a system controller;
   d) directing the casting into engagement with said cutoff blade using said robot arm;
   e) controlling the cutting force of the casting engaging said cutoff blade with said compliance control system biasing said cutoff blade with respect to the casting to maintain the constant cutting force between the casting and said cutoff blade, the step of controlling the cutting force further comprising:

connecting said compliance regulator that measures and regulates pressure in said actuator to said system controller, said system controller providing a preset pressure setpoint in said compliance regulator; and controlling the pressure in said actuator with said compliance regulator to bias said cutoff blade as said casting comes into contact with said cutoff blade.

7. A method for cutting off excess material from a casting comprising the steps of:
   a) programming a system controller to cooperatively manage a robot arm and a compliance system controlling a cutting force of a cutoff blade for removing the excess material from the casting;
   b) engaging the casting with said robot arm;
   c) transporting the casting with said robot arm to a position proximate a cutoff blade engaged by said compliance control system, said compliance control system including an actuator that is controlled by a compliance regulator connected to a system controller, said compliance regulator measuring and regulating pressure in said actuator and said system controller providing a present pressure setpoint in said compliance regulator;
   d) urging the casting into engagement with said cutoff blade with said robot arm;
   e) controlling the cutting force of the casting engaging said cutoff blade with said compliance control system biasing the cutoff blade with respect to the casting so the cutting force is maintained at a constant between the casting and said cutoff blade by controlling the pressure in said actuator with said compliance regulator to bias said cutoff blade as said casting comes into contact with said cutoff blade.

* * * * *